Patented May 27, 1924.

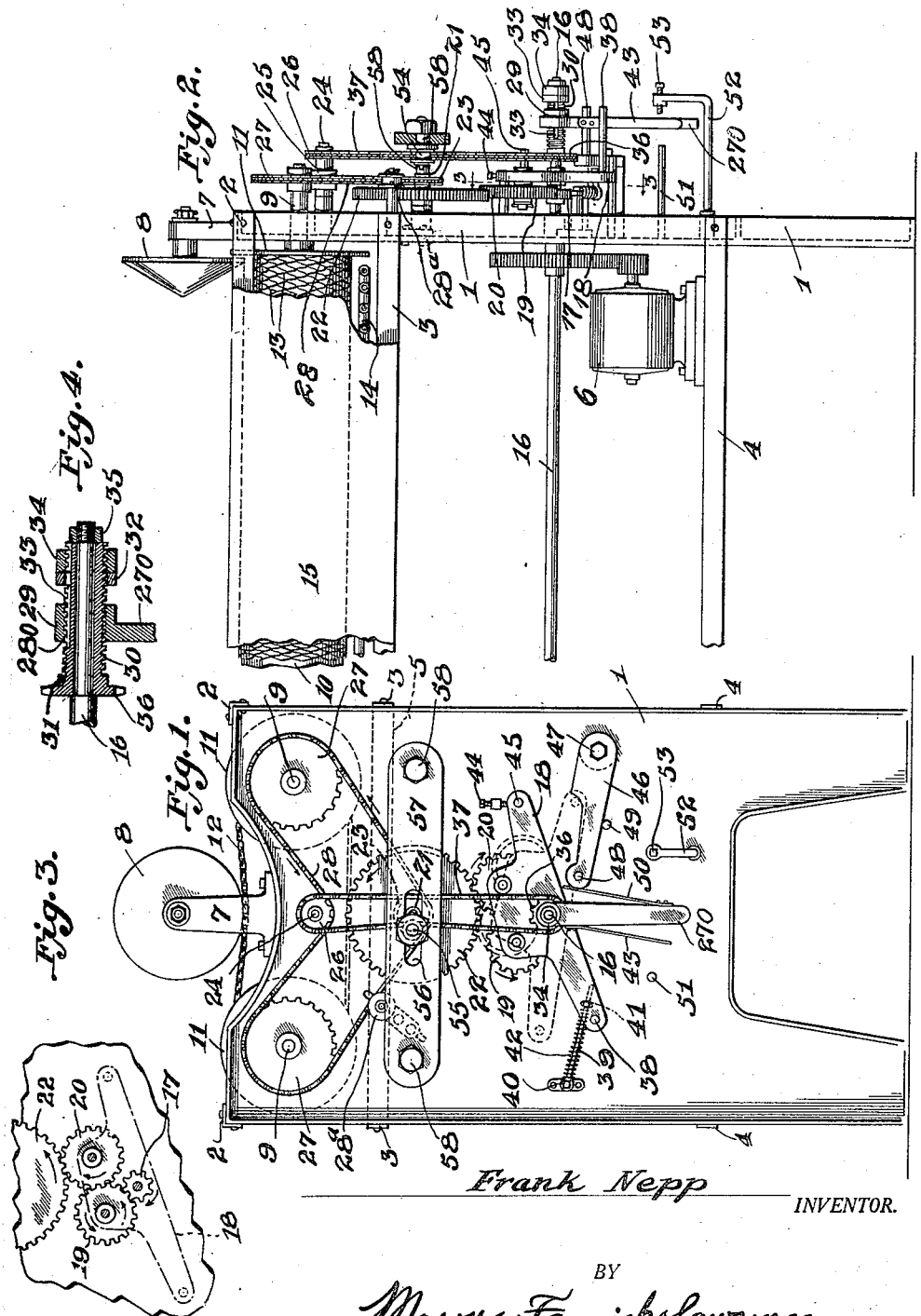

1,495,427

UNITED STATES PATENT OFFICE.

FRANK NEPP, OF CHICAGO, ILLINOIS, ASSIGNOR TO PEERLESS CONFECTION COMPANY, OF CHICAGO, ILLINOIS, A CORPORATION OF ILLINOIS.

AUTOMATIC REVERSIBLE BATCH ROLLER.

Application filed July 12, 1921. Serial No. 484,172.

*To all whom it may concern:*

Be it known that I, FRANK NEPP, a citizen of Germany, residing at Chicago, in the county of Cook and State of Illinois, have invented certain new and useful Improvements in Automatic Reversible Batch Rollers; and I do hereby declare the following to be a full, clear, and exact description of the invention, such as will enable others skilled in the art to which it appertains to make and use the same.

This invention appertains to mechanism for use in working batches of plastic material, particularly candy.

It comprises a member having a movable surface such as a travelling apron for supporting and rolling the batch; mechanism for moving the apron; automatic reversing mechanism for causing the apron to travel alternately in opposite directions; means for varying the extent of the alternate movements of the apron in opposite directions, and improvements in subcombinations and details of construction as more fully described hereinafter and defined in the appended claims.

In the accompanying drawings, Figure 1 is an elevation of one end of the improved machine;

Figure 2 is a side elevation of the mechanism shown in Figure 1;

Figure 3 is a fragmentary section on line 3—3 of Figure 2 illustrating the receiving train;

Figure 4 is a sectional view of the sleeve and trip arm for shifting the reversing train.

Like reference characters designate like parts throughout the several views.

I have illustrated and now describe a preferred embodiment of my invention.

The frame comprises two similar end plates, one of which is indicated at 1; suitable tie bars 2, 3 and 4, connecting said end plates at top and sides; a horizontal partition 5 extending between the bars 3, and a support connected to the bars 4 for a motor 6. Extending upward from the middle of one end frame 1 is a bearing standard 7 for supporting rotatably a disk 8 for a purpose to be later stated.

Running fore and aft of the frame near its top is a pair of parallel shafts 9 journaled in the end plate 1, and preferably equally spaced from the perpendicular center and from the axis of disk 8. A cylindrical roller 10 is secured to each shaft 9. The rollers 10 are preferably of equal dimensions, are mounted concentric with shafts 9, and each has a flange 11 at each end, of the form illustrated at one end thereof in Figures 1 and 2. For the purpose of supporting a batch of candy or the like to be rolled or worked, an endless apron 12 preferably of equal length from edge to edge embraces the rollers so that its upper and lower plies are stretched between them, the upper ply serving as a support for the batch. Rotation of the rollers 10 causes the upper ply of the apron 12 to travel toward one side or the other of the frame according to the direction of rotation of the rollers. The disk 8, previously mentioned, is disposed symmetrically between the rollers just above the edge of the upper ply of apron 12. The disk 8 may be in the form of a shallow cone. When a batch of plastic candy or the like rests upon the upper ply of apron 12 in contact with disk 8, the apex of which may penetrate the batch, the batch may be caused to roll upon the apron as the latter travels, the disk preventing movement of the batch in one direction transverse of the path of movement of the upper ply, and tending to retain the batch in the fore and after center of the ply. Thus the moving apron rotates or rolls the batch while the candy maker, standing near the end of the machine that is opposite that supporting the disk 8, manipulates the end of the batch, pulling out the candy or the like to any desired diameter as the batch rotates, thus imparting a twisted structure to the pulled out end.

The apron 12 is of non-absorbent material and is preferably constructed of a multiplicity of metallic links. Each link consists of a helix 13 of wire extending transversely of the direction of movement of the apron or parallel with the axis of the rollers 10. Each helical link 13 is transversely flattened so as to form an oval as viewed from the end. The several links are interlaced as shown, and constitute a broad link belt that is perfectly flexible in the direction of travel but comparatively unyielding in a direction at right angles thereto or parallel with the axes of the rolls. A belt of this construction is well adapted to roll a batch of plastic material because the relief points formed by the upper portions of the turns of the wires sink somewhat into the plastic mass and provide an efficient engagement for the purpose. An apron of the described construction is particularly well suited for the purpose of manipulating candy or other plastic batches of material intended to be eaten, because it is non-absorbent, has no pintle bearings or crannies inaccessible to cleansing fluids and instruments, and may therefore be maintained in sanitary condition.

In order to keep a candy batch in a condition of plasticity while being worked, a heat transfer means such as a coil of pipe 14 may be disposed in the space between the lower ply of apron 12 and the shelf 5. The space containing the coil 14, may be inclosed by the side plate 15, if desired, to prevent convection currents from flowing freely through said space and dissipating the heat.

A preferred mechanism for imparting movement to and controlling the movements of the batch rolling apron will now be described:

The main drive shaft 16 extends longitudinally of the frame, is journaled in the end plates and extends beyond one of said plates 1 at one end of the machine, as illustrated in Figure 2; and at this end all of the transmission and controlling mechanism between said main shaft 16 and the apron driving rollers 10 are located. The shaft 16 may be rotated continuously during the period it is desired to keep the machine in operation, from any suitable source of power. It is shown geared in a conventional way to the armature shaft of the electric motor 6, and may be geared to said armature shaft by any suitable gearing designed to impart the desired speed and direction of rotation. Keyed to said drive shaft 16 adjacent the outer face of frame plate 1 is a spur pinion 17, and pivoted on said shaft 16 in front of the pinion 17 is a rocker or gear shifting plate 18 on which are pivoted two spur gears 19 and 20 with their teeth intermeshing, the gear 19 being also continually in mesh with said pinion 17. Pinion 17 with gears 19 and 20 constitutes the reversing train.

A stub shaft 21 projects from the outer face of frame plate 1 above the shaft 16 and substantially in the longitudinal perpendicular plane of its axis. Rotatably mounted on the stub shaft 21 is a spur gear 22 with which the teeth of either the gear 19 or the gear 20 may mesh, dependent on the position of the shifter plate 18. If the left hand end of the shifter plate 18, as viewed in Figure 1 is depressed, gear 22 will be rotated by the train of gearing 17, 19 and 20, while if the right hand end of the shifter plate is depressed, gear 22 will be rotated in the opposite direction by the train of gears 17, 19; gear 20 in the last named position moving idly. Thus, while the shaft 16 is running continuously in one direction, the gear 22 may be rotated thereby in the same or in the opposite direction according to whether the gear 19 or the gear 20 is in mesh with said gear 22.

Rigidly mounted with respect to the gear 22 is a sprocket pinion 23, which is therefore compelled to turn with the gear 22 on the stub shaft 21. Projecting from the outer face of said frame plate 1 perpendicularly above the stub shaft 21 is a stub shaft 24, on which are sleeved two rigidly connected sprocket pinions 25 and 26, so that both of necessity rotate together. The projecting ends of shafts 9, to which the described rollers 10 are secured, carry sprocket wheels 27 fixed thereto. Looped around the sprocket wheels 27 is a sprocket chain 28, the upper and lower plies of which are depressed and engage, respectively, the under peripheries of the described sprocket pinions 25 and 23. An adjustable guide or tightener roller 28ª keeps the chain tensioned.

By means of the gearing assemblage thus far set forth the main shaft will rotate the sprocket pinion 23 (as viewed in Fig. 1) clockwise when the rocker plate 18 is in one of its two described positions and counter clockwise when it is in the other position. The sprocket pinion 23 engaged in the bight of the lower ply of sprocket chain 28, constitutes the direct driver for said chain, causing it to travel in one direction or the other, and therefore rotates the rollers 10 simultaneously clockwise or counter clockwise to cause the apron 12 to travel toward the right or toward the left.

In order automatically to reverse the direction of travel of the apron 12 at regular, and more or less frequent intervals, a mechanism actuated by the driving train thus far set forth will now be described:

A kicker or tripping member 270, controlled by a portion of the train that moves in unison with the apron 12, when moved in one direction shifts the reversing mechanism to cause the apron to move in one direction and when said tripping member is moved oppositely, it shifts the reversing mechanism so as to reverse the travel of said apron. The actuating movements of said tripping member 270 may be timed so as to provide longer or shorter time intervals between shifting operations by a manually adjustable device. The said tripping member consists of a substantial arm 270 having a threaded hole 280 extending through a hub 29 at one end. Through said threaded hole extends an exteriorly threaded shaft 30, which in the described embodiment is a hollow sleeve mounted on the shaft 16 so as to rotate freely thereon, but is prevented from endwise movement by a shoulder 31 and an adjustable stop ring 32. The ring 32 is provided with a feather engaging a groove 33 in the threaded shaft or sleeve 30. The stop ring 32 may therefore be adjusted longitudinally of said sleeve, but cannot rotate relatively to it and must rotate with it. The stop ring may be adjusted toward the frame plate 1 by rotating a nut or threaded adjusting ring 34 to the right (as viewed in Fig. 1) or it may be set farther from said plate 1 by turning the adjusting ring 34 to the left, the sleeve 30 bearing a right hand thread in the disclosed embodiment. Any convenient removable stop, such as the nut 35, may be provided, if found desirable, to prevent accidental unscrewing of the adjusting ring from the said threaded sleeve. Integral with or securely fixed to the inner end of threaded sleeve 30 is a sprocket wheel 36, which is adapted to be rotated by a sprocket chain 37 that engages it and the sprocket wheel 26, before mentioned as rigid with sprocket wheel 25 that engages in the bight of the upper ply of the apron roller driving chains 28, and is, therefore, driven by said chain in one direction or the other, as described. Looking now at Fig. 1, movement of the chain 28 in a counterclockwise direction to cause the apron 12 to move to the left, rotates the sleeve 30 in a clockwise direction. The trip arm 270, threaded freely on said sleeve and depending therefrom, therefore travels outward toward the stop 32. When the arm 270 comes into contact with said stop 32 it can travel no further lengthwise of the sleeve but immediately rotates with it in a clockwise direction. Projecting from the left hand end of the rocker plate 18 in a direction parallel with the said sleeve 30 is a pin 38 with which the trip arm 270 engages during its clockwise movement. This operation rocks the plate 18 in a direction to disengage the gear 20 from gear 22. The rod 39, pivoted on a bracket 40 secured to the frame plate, extends through a swiveled guide 41 on the rear of the rocker plate 18. Surrounding said rod 39 is a compression spring 42. The elastic pressure of the spring insures that the arm 18 will be rocked far enough to effect the engagement of gears 19 and 22, when the trip arm 270 has moved the said rocker arm so that the pressure of the spring is exerted above the line connecting the pivot at 40 with the center of oscillation of the rocker arm. The spring 42 presses the rocker arm into position to maintain the gear 20 in mesh, when the line of direction extended from rod 39 passes beneath the center of oscillation of the rocker arm, as illustrated in Fig. 1. The impact of the trip arm moves the rocker past the "dead center" or point where the line of direction of the rod 39 intersects the center of the rocker arm and spring 42 carries it the rest of the way. This insures against the stoppage of the mechanism in the event that the impact of the trip arm is insufficient to complete the shift of the gears of the reversing train, and holds the gears in mesh in the position to which they have been shifted until the impact of the trip arm again disengages them. A flat spring 43 cushions the blow of the arm 30 on the pin 38, and relieves said arm and pin of wear. If the spring should break, another may be quickly substituted. An adjustable stop 44 mounted on frame plate 1 prevents the teeth of gear 20 from engaging gear 22 with too much pressure and may be adjusted to hold said gears in pitch line engagement or most efficient operating position. A short pin 45 projects formed from the right hand end of the rocker plate 18. Said pin 45 is in position to be engaged by a lever 46, pivoted to a stud 47 in the frame plate. A pin 48 projects from the free end of lever 46 in position to be engaged by the trip arm 270, when, during the counter clockwise rotation of sleeve 30, said trip arm has traveled inward on said sleeve, engaged the hub of sprocket wheel 36 and been swung in a counter clockwise direction. Impact of the trip arm with pin 48 lifts the lever 46, which in turn lifts the right hand end of rocker plate 18, forcing it past the dead center so that the expansion force of spring 42 may complete the movement of the shifter plate 18. A pin 49 projecting from the frame plate serves to hold the lever arm 46 in proper position, and also to stop the rocking movement of plate 18 when gear 19 meshes with gear 22. Said stop 49 may be an adjustable stop if desired. Spring 50 cushions the impact of the trip arm 27 against pin 48, and relieves said arm and pin from excessive wear.

The drive chain 37 may be kept taut by an adjustable roller 54 carried on a stub shaft 55, adjustably clamped in a slot 56, in a bar 57 secured transversely in front of said chain 37. Said bar may be suitably spaced from the frame plate 1 by spacing studs 58.

Bumper arms 51 and 52 are secured to the frame plate 1 on opposite sides of the path of trip arm 27 as it moves along the sleeve 30. Arm 52 has an upturned end, through which is threaded an adjustable stop 53. After the trip arm has been thrown in a counter clockwise direction, the gears 19 and 22 engaging, cause the sleeve 30 to reverse. The trip arm then swings downward. In order to prevent it from swinging far enough to rock the shifter plate on its return, the stop 53 is interposed in substantially the position shown, while the stop 51 is placed on the opposite side projecting just far enough to engage the trip arm upon reverse in the opposite direction. Stop 53 may be adjusted in or out to accord with the position of the stop ring 32, before described as being for the purpose of regulating the extent of travel of the trip arm so as to regulate the amplitude of the reciprocations or alternate movements of the apron 12 in opposite directions.

What I claim and desire to secure by Letters Patent is:

1. In mechanism of the class described, a main driver and a driven mechanism, an interposed reversing train comprising a shifter plate carrying reversely driven members, a projection on said shifter plate, an externally threaded member rotated by the driven mechanism, a stop on said threaded member, a trip arm threaded on said threaded member and adapted to travel idly lengthwise thereof, said projection on the shifter plate being in the path of the rotary movement of the shifter arm when it engages said stop, and is caused to rotate with said threaded member.

2. In mechanism of the class described, a main driver and a driven mechanism, an interposed reversing train comprising a shifter plate carrying reversely driven members, projections operatively related to said shifter plate, an externally threaded member rotated by the driven mechanism, spaced stops on said threaded member, a trip arm threaded on said threaded member between said stops adapted to travel idly lengthwise thereof, a cushioning spring on each side of said trip arm, one of said projections being in the path of the rotary movement of the shifter arm when it engages one of said stops and is caused to rotate with said threaded member, and the other of said projections being in the path of the rotary movement of the shifter arm when it engages the other of said stops.

3. In mechanism of the class described, a shaft having a driving pinion, a shifter plate pivoted on said shaft and carrying oppositely driven gears rotated by said pinion, a driven gear adapted to be engaged alternately by said oppositely driven gears, a threaded sleeve on said shaft, means for rotating said threaded sleeve from said driven gear, spaced stops on said sleeve, a shifter arm threaded on said sleeve between said stops and adapted to travel idly along said sleeve, projections operatively related to actuate said shifter plate, one of said projections being in the path of arcuate movement of said shifter arm when it is rotated in one direction or the other by contact with one or the other of said stops.

4. In mechanism of the class described, a main driver and a driven gear, a rockable shifter plate carrying oppositely driven gears driven from said driver, said oppositely driven gears being adapted to be engaged alternately with said driven gear according to the position of said shifter plate, projections on opposite ends of said shifter plate, a lever engaging the projection at one end of said shifter plate, a rotary threaded sleeve having spaced stops on the threaded portion, a trip arm threaded on said sleeve and adapted to travel idly between said stops, means for rotating said sleeve from said driven gear, one of said projections on said arm being in the path of the arcuate movement of the trip arm when the trip arm has reached the outer end of its movement and the said lever being in the path of arcuate movement of said trip arm when it has reached the inner end of its movement.

5. In mechanism of the class described, a main driver and a driven mechanism, a rockable shifter plate carrying oppositely driven members of a reversing train, said members being driven by the main driver, an externally threaded member having spaced stops, means for rotating said sleeve from said driven mechanism, a trip arm threaded on said threaded member between said stops, a means operatively related to said shifter plate adapted to be engaged by the trip arm to operate said shifter plate when said trip arm rotates by engagement with one of said stops, and a bumper adapted to prevent overthrow of the trip arm when reverse movement takes place.

6. In mechanism of the class described, a driver, a driven mechanism, a shifter plate carrying oppositely driven gears driven by said driver and adapted to be alternately engaged with said driven mechanism, a rotary threaded member adapted to be rotated by said driven mechanism, a trip arm threaded on said rotary threaded member, spaced stops on said threaded member, means for adjusting one of said stops longitudinally of said threaded member and means operatively related to said shifter plate in the path of arcuate movement of said trip arm at each end of its longitudinal travel whereby said trip arm may move said shifter plate alternately in opposite directions.

7. In mechanism of the class described, a main driver and a driven mechanism comprising a pair of rotary members, a sprocket chain for rotating said rotary members, a sprocket wheel engaging the lower ply of said sprocket chain, a reversing train, a sprocket wheel engaging the upper ply of said roller driving chain, a rotary threaded member carrying a sprocket wheel, a sprocket chain between said last mentioned sprocket wheel and said sprocket wheel that engages the upper ply of said roller driving sprocket chain, a trip adapted to travel idly on said threaded member and to shift said reversing train at each end of its idle travel.

8. In mechanism of the class described, a driver and a driven gear, a shifter plate carrying reversely rotating gears, a spring acting on said shifter plate for forcing one or the other of said reversely driven gears into engagement with said driven gear, means for moving said shifter plate to disengage one or the other of said gears, and a stop arranged to engage said plate and regulate the engagement of a reversing gear with said driven gear.

In testimony whereof I affix my signature.

FRANK NEPP.